| [19] | United States Patent | [11] | Patent Number: | 4,727,170 |
| Nagai et al. | | [45] | Date of Patent: | Feb. 23, 1988 |

[54] DIMETHYLPHENYLSILYLMETHYL-POLYSILANE AND METHOD FOR PRODUCING THE SAME

[75] Inventors: Yoichiro Nagai, Yamato; Hamao Watanabe, Kiryu, both of Japan

[73] Assignee: Yuki Gosei Kogyo Co., Ltd., Tokyo, Japan

[21] Appl. No.: 65,463

[22] Filed: Jun. 23, 1987

[30] Foreign Application Priority Data

Jul. 4, 1986 [JP] Japan ................................ 61-157413

[51] Int. Cl.$^4$ ................................................ C07F 7/08
[52] U.S. Cl. .................................................... 556/430
[58] Field of Search ........................................... 556/430

[56] References Cited

U.S. PATENT DOCUMENTS

| 4,260,780 | 4/1981 | West | 556/430 |
| 4,414,403 | 11/1983 | Schilling et al. | 556/430 |
| 4,472,591 | 9/1984 | Schilling et al. | 556/430 |
| 4,587,205 | 5/1986 | Harrah et al. | 556/430 X |

*Primary Examiner*—Paul F. Shaver
*Attorney, Agent, or Firm*—Flynn, Thiel, Boutell & Tanis

[57] ABSTRACT

A dimethylphenysilylmethylpolysilane is prepared by condensating 1,1-dichloro-1,2,2-trimethyl-2-phenyldisilane in the presence of an alkali metal or alkali earth metal, in an aprotic solvent. This polymer is a viscous liquid which has a weight average molecular weight in the range of from 5,000 to 500,000 and a narrow molecular weight distribution, and has various uses as electroconductors, photoresist and optical information recording materials.

7 Claims, No Drawings

DIMETHYLPHENYLSILYLMETHYLPOLYSILANE AND METHOD FOR PRODUCING THE SAME

BACKGROUND OF THE INVENTION (1) Field of the Invention

This invention relates to a novel compound, dimethylphenylsilylmethylpolysilane, being usable as materials for electroconductor, photoresist, optical information recording material and the like, and a method for producing the same.

(2) Description of the Prior Art

As the method for producing the polysilane compound, The Journal of American Chemical Society, Vol. 71, page 963 (1949) and Chemistry Letters, page 551 (1976) disclose each the method for producing a chain or cyclic dimethylpolysilane having a repeating unit expressed by the following formula:

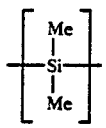
(1)

wherein, Me is methyl, by reacting dichlorodimethylsilane with sodium metal in benzene or xylene.

Further, U.S. Pat. No. 4,260,780 discloses the process for obtaining phenylmethylpolysilane, represented by the following formula:

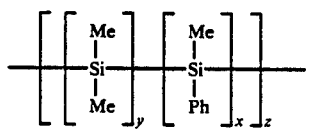
(2)

wherein, Me is methyl, Ph is phenyl, the ratio of x to y is 1:3 to 1:20, and z is an integer ranging from 1 to 100, by reacting dichlorodimethylsilane with dichloromethylphenylsilane in the presence of an alkali metal in a solvent of xylene, tetrahydrofuran or the like.

However, the conventional polysilanes, as shown in the abovementioned formula (1) or (2), are all built up of a principal chain comprising a silicon-silicon bond and substituents, namely methyl and phenyl groups, introduced into said principal chain. Among them, accordingly, can never be found polysilanes which comprise introducing dimethylphenylsilyl group as proposed by this invention.

It is one object of this invention, therefore, to provide a novel dimethylphenylsilylmethylpolysilane constructed so as to introduce the substituents such as dimethylphenylsilyl and methyl groups into the principal chain comprising the silicon-silicon bond.

Another object of the invention is to provide a method for producing dimethylphenylsilylmethylpolysilane.

Other objects and advantages will be apparent from the accompanying disclosure.

SUMMARY OF THE INVENTION

This invention provides dimethylphenylsilylmethylpolysilane which comprises a repeating unit represented by the following formula [I]:

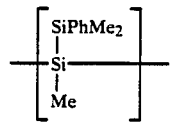
[I]

wherein, Ph is phenyl, and Me is methyl, and has a weight average molecular weight in the range of from 5,000 to 500,000.

The dimethylphenylsilylmethylpolysilane according to this invention can be prepared by reacting disilane having the following formula [II]:

$$PhMe_2SiSiCl_2Me \qquad [II]$$

wherein, Ph is phenyl, and Me is methyl, with an alkali metal or alkali earth metal.

The disilane [II], starting material for the polymer of this invention, can be obtained by reacting 1,1,2-trichloro-1,2,2-trimethyldisilane with phenylmagnesium halide in the presence of a transition metal catalyst other than cobalt as disclosed in U.S. Ser. No. 011,804 filed on Feb. 6, 1987.

One reactant of this reaction, namely 1,1,2-trichloro-1,2,2-trimethyldisilane, can be obtained from the disilane fraction by-produced when synthesizing dichlorodimethylsilane from methyl chloride and silicon metal.

DETAILED DESCRIPTION OF THE INVENTION

According to this invention, the disilane [II] and the alkali metal or alkali earth metal are reacted in the aprotic solvent such, for instance, as a solvent of n-pentane, n-hexane, benzene, toluene or tetrahydrofuran. As an alkali metal, lithium, sodium, potassium and the like are utilized, and as an alkali earth metal, magnesium, calcium or the like are utilized. Among them, lithium, and magnesium are especially preferable.

The amount of alkali metal or alkali earth metal used is required to be at least two equivalent, normally two to three equivalent, per one equivalent of disilane [II].

As reaction temperatures, optional ones in the range of from more than 0° C. to less than the boiling point of a reaction solvent used are employed. Reaction is completed by heating a reaction mixture to the boiling point of the reaction solvent at a proper time after start of the reaction. The reaction time somewhat varies dependent upon the reaction solvent and reaction temperatures used. Generally speaking, however, the reaction completes in 1 to 5 hours.

After completion of the reaction, a reaction product is refined in a usual manner for refining polysilanes, for instance a manner of repeating reprecipitation by the use of benzene and alcohol or the like, thereby obtaining the dimethylphenylsilylmethylpolysilane of this invention.

This invention has found that by selecting the disilane [II] as the starting material and condensing the same in the presence of the alkali metal or alkali earth metal, there can be obtained a novel dimethylphenylsilylmethylpolysilane constructed so as to introduce the substituents such as dimethylphenylsilyl and methyl groups into the principal chain comprising the silicon-silicon bond.

The dimethylphenylsilylmethylpolysilane according to this invention, is characterized by that it has a weight average molecular weight ($\overline{Mw}$) ranging from 5,000 to 500,000 and a narrow distribution of molecular weight as is supported by the fact that the ratio of weight average molecular weight ($\overline{Mw}$) to number average molecular weight ($\overline{Mn}$), namely $\overline{Mw}/\overline{Mn}$, is 1.6. The polymer to be provided by this invention has various uses as raw materials for making electroconductors, photoresist, optical information recording materials and the like.

EXAMPLE 1

The inside of a 1-liter, 3-neck flask fitted with a condenser, dropping funnel, thermometer and stirrer was replaced by argon. Thereafter, 300 g of toluene and 23 g (1 mole) of sodium were fed thereto, and a toluene solution of 124.5 g (0.5 mole) of 1,1-dichloro-1,2,2-trimethyl-2-phenyldisilane was dropped in the same with stirring at a reaction temperature of from 30° to 50° C. in 1 hour. After completion of dropping, the reaction mixture was heated gradually and was allowed to react for 3 hours while refluxing. Then, the resulting reaction product was cooled to a room temperature, the by-produced sodium salt was separated by filtration, and the filtrate was concentrated by distilling out the toluene. The concentrated filtrate was added with 300 ml of benzene, and further added with 1 liter of methanol with stirring. This mixture was left standing to thereby obtain a polysilane layer as a bottom layer. This bottom polysilane layer was recovered and further the solvent remaining under reduced pressure was removed completely to thereby obtain 57.9 g of a viscous liquid dimethylphenylsilylmethylpolysilane. Yield was 65%. The results obtained from analysis of the product are as shown below:

Proton nuclear magnetic: resonance spectrum (60 MHz, CDCl$_3$); δ ppm=0.3 (Broad, Si-Me), 7.2 (Broad, Si-Ph) Me-Ph (Proton ratio)=9/5.1.

Infrared absorption spectrum (cm$^{-1}$): 3050, 2950, 2890, 2070, 1950, 1875, 1810, 1580, 1480, 1420, 1400, 1240, 1100.

Ultraviolet absorption spectrum (nm): 275.

Gel permeation chromatography: Measuring conditions: Column pressure: 30 kg/cm$^2$, Flow rate: 1.25 ml/min., Column: TSK Gel GMH6, 7.5 mm×60 cm, Eluent: Tetrahydrofuran; Weight average molecular weight ($\overline{Mw}$)=78,000; $\overline{Mw}/\overline{Mn}$=1.6.

EXAMPLE 2

By using the same apparatus as Example 1, a tetrahydrofuran solution of 124.5 g (0.5 mole) of 1,1-dichloro-1,2,2-trimethyl-2-phenyldisilane was dropped in a mixture of 300 g of tetrahydrofuran and 7 g (1 mole) of lithium at a reaction temperature of from 0° to 15° C. in 1 hour. Thereafter, the same was allowed to react for 3 hours while refluxing. Then, the resulting reaction product was treated according to the same procedure as Example 1 to thereby obtain 59.7 g of a viscous liquid dimethylphenylsilylmethylpolysilane. Yield was 67%.

The results obtained from analysis of the product are as shown below:

Proton nuclear magnetic: resonance spectrum (60 MHz, CDCl$_3$); δ ppm=0.3 (Broad, Si-M3); 7.2 (Broad, Si-Ph); Me/Ph (Proton ratio)=9/5.1.

Infrared absorption spectrum (cm$^{-1}$): 3050, 2950, 2890, 2070, 1950, 1875, 1810, 1580, 1480, 1420, 1400, 1240, 1100.

Ultraviolet absorption spectrum (nm): 275.

Gel permeation chromotography: Measuring conditions: The same as utilized in Example 1; Weight average molecular weight ($\overline{Ms}$)=50,000; $\overline{Mw}/\overline{Mn}$=1.6.

We claim:

1. A dimethylphenylsilylmethylpolysilane having a repeating unit represented by the formula [I] and having a weight average molecular weight of from 5,000 to 500,000:

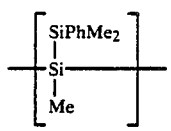

[I]

wherein, Ph is phenyl and Me is methyl.

2. The dimethylphenylsilylmethylpolysilane according to claim 1 in which the ratio of weight average molecular weight to number average molecular weight is 1.6.

3. A method for producing a dimethylphenylsilylmethylpolysilane having a repeating unit represented by the formula [I]:

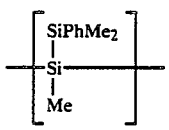

[I]

wherein, Ph is phenyl and Me is methyl, and having a weight average molecular weight of from 5,000 to 500,000, which comprises the step of condensating 1,1-dichloro-1,2,2-trimethyl-2-phenyldisilane represented by the formula [II]:

PhMe$_2$SiSiCl$_2$Me      [II]

wherein, Ph is phenyl and Me is methyl, in the presence of an alkaline metal or alkali earth metal, in an aprotic solvent.

4. The method according to claim 3 in which 2 to 3 equivalents of said alkaline metal or alkali earth metal are used per 1 equivalent of said 1,1-dichloro-1,2,2-trimethyl-2-phenyldisilane represented by the formula [II].

5. The method according to claim 3 in which said aprotic solvent is any one of n-pentane, n-hexane, benzene, toluene and tetrahydrofuran.

6. The method according to claim 3 in which said alkali metal is lithium or sodium.

7. The method according to claim 3 in which said alkaline earth metal is magnesium.

* * * * *

UNITED STATES PATENT AND TRADEMARK OFFICE
CERTIFICATE OF CORRECTION

PATENT NO. : 4 727 170

DATED : February 23, 1988

INVENTOR(S) : Yoichiro NAGAI et al

It is certified that error appears in the above-identified patent and that said Letters Patent is hereby corrected as shown below:

Column 4, line 50; change "alkaline metal or alkali earth metal" to ---alkali metal or alkaline earth metal---.

Column 4, line 53; change "alkaline metal or alkali earth metal" to ---alkali metal or alkaline earth metal---.

Signed and Sealed this

Thirteenth Day of June, 1989

*Attest:*

DONALD J. QUIGG

*Attesting Officer*     *Commissioner of Patents and Trademarks*